(12) United States Patent
Pan et al.

(10) Patent No.: US 12,743,248 B2
(45) Date of Patent: Sep. 22, 2026

(54) DATA SORTING METHODS AND APPARATUSES, DEVICES, AND READABLE STORAGE MEDIA

(71) Applicant: Alipay (Hangzhou) Information Technology Co., Ltd., Hangzhou (CN)

(72) Inventors: Wuqiong Pan, Hangzhou (CN); Tao Wei, Hangzhou (CN); Tingting Li, Hangzhou (CN); Haonan Feng, Hangzhou (CN); Tianyi Li, Hangzhou (CN); Zhongtian Qian, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/872,041

(22) PCT Filed: Aug. 28, 2023

(86) PCT No.: PCT/CN2023/115347
§ 371 (c)(1),
(2) Date: Dec. 5, 2024

(87) PCT Pub. No.: WO2024/139320
PCT Pub. Date: Jul. 4, 2024

(65) Prior Publication Data

US 2025/0362868 A1 Nov. 27, 2025

(30) Foreign Application Priority Data

Dec. 31, 2022 (CN) ......................... 202211735449.3

(51) Int. Cl.
*G06F 7/00* (2006.01)
*G06F 7/08* (2006.01)
*G06F 21/60* (2013.01)

(52) U.S. Cl.
CPC .............. *G06F 7/08* (2013.01); *G06F 21/602* (2013.01)

(58) Field of Classification Search
None
See application file for complete search history.

(56) References Cited

U.S. PATENT DOCUMENTS 11,704,443 B2 * 7/2023 Elenes .................. G06F 21/602 713/189
2006/0285682 A1 * 12/2006 Sarangarajan ........... G09C 1/00 380/28
(Continued)

FOREIGN PATENT DOCUMENTS

CN 110087237 A 8/2019
CN 112395623 A 2/2021
(Continued)

OTHER PUBLICATIONS

Li, Jingwei, Patrick PC Lee, Chufeng Tan, Chuan Qin, and Xiaosong Zhang. "Information leakage in encrypted deduplication via frequency analysis: Attacks and defenses." ACM Transactions on Storage (TOS) 16, No. 1 (2020): 1-30. (Year: 2020).*
(Continued)

*Primary Examiner* — Farhan M Syed

(57) ABSTRACT

This specification discloses a data sorting method and apparatus, a device, and a readable storage medium. In the data sorting method provided in this specification, a non-reference ciphertext is updated based on a first noise value corresponding to the non-reference ciphertext and a first specified parameter, and each non-reference ciphertext is compared with an updated reference ciphertext. Further, a to-be-processed array is divided into a plurality of subarrays based on a first comparison result. Each subarray is separately re-used as a to-be-processed array. The above-mentioned comparison process is repeated until each array
(Continued)

includes only a single ciphertext. A sorting result of each ciphertext is determined based on a size relationship between the arrays.

20 Claims, 4 Drawing Sheets

(56) References Cited

U.S. PATENT DOCUMENTS

| | | | | |
|---|---|---|---|---|
| 2014/0348324 | A1* | 11/2014 | Callen | H04L 9/34 380/28 |
| 2016/0004874 | A1* | 1/2016 | Ioannidis | H04L 9/302 713/165 |
| 2016/0020903 | A1* | 1/2016 | De Perthuis | H04L 9/30 380/44 |
| 2017/0250796 | A1* | 8/2017 | Samid | H04L 9/0838 |
| 2017/0331624 | A1* | 11/2017 | Samid | H04L 9/0618 |
| 2019/0207745 | A1* | 7/2019 | Si | H04L 9/0894 |
| 2021/0256162 | A1* | 8/2021 | Liphardt | G06F 21/6245 |
| 2022/0255722 | A1 | 8/2022 | Cheon et al. | |
| 2022/0416996 | A1* | 12/2022 | Cunningham | H04L 9/0643 |
| 2023/0269073 | A1* | 8/2023 | Dolev | H04L 9/0643 380/28 |

FOREIGN PATENT DOCUMENTS

| | | | |
|---|---|---|---|
| CN | 114168977 | A | 3/2022 |
| CN | 114840568 | A | 8/2022 |
| CN | 116166216 | A | 5/2023 |
| WO | 2020253106 | A1 | 12/2020 |

OTHER PUBLICATIONS

Zhang, D., Zhou, C., Li, S., Yu, D., & He, K. (2020). Evaluation of Information Leakage of Cryptographic Chip Based on Variance. IEEE Letters on Electromagnetic Compatibility Practice and Applications, 2(4), 174-177. (Year: 2020).*

Jurado, M., Palamidessi, C., & Smith, G. (Jun. 2021). A formal information-theoretic leakage analysis of order-revealing encryption. In 2021 IEEE 34th Computer Security Foundations Symposium (CSF) (pp. 1-16). IEEE. (Year: 2021).*

The International Search Report and Written Opinion of the International Searching Authority for International Application No. PCT/CN2023/115347 mailed on Nov. 17, 2023. pp. 1-9.

Li Shundong et al., "Secure Multiparty Multi-Data Ranking", Chinese Journal of Computers, Aug. 15, 2020, pp. 1448-1462, vol. 43, No. 8, 2020, China Science Publishing & Media Ltd., Xi'an, China.

Ren Hui et al., "Secure Comparator Based Privacy-preserving Sorting Algorithms for Clouds", Computer Science, May 15, 2018, pp. 139-167, vol. 45, No. 5, 2018, Chongqing Southwest Information Co., Ltd., Nanjing, China.

Yan Xiaolong, "Research on Multi-keyword Ranked Search Technology in Cloud Storage", Outstanding China Master's Thesis Full-text Database, Aug. 15, 2018, pp. 1-64, vol. 45, No. 5, 2018, China.

Chatterjee A et al., "Accelerating Sorting of Fully Homomorphic Encrypted Data", Progress in Cryptology—INDOCRYPT 2013, Dec 26, 2013, pp. 1-12, Springer, Cham, India.

* cited by examiner

DATA SORTING METHODS AND APPARATUSES, DEVICES, AND READABLE STORAGE MEDIA

CROSS-RELATED APPLICATIONS

This specification is a national stage entry of international application no. PCT/CN2023/115347, filed Aug. 28, 2023, which claims priority to Chinese Patent Application No. 202211735449.3, filed with the China National Intellectual Property Administration on Dec. 31, 2022, which is incorporated herein by reference in its entirety.

TECHNICAL FIELD

This specification relates to the field of computer technologies, and in particular, to data sorting methods and apparatuses, devices, and readable storage media.

BACKGROUND

With increasing attention to privacy data, the data security field has attracted wide attention. To improve privacy security of data, the data can be stored in a form of a ciphertext. Based on actual needs of users, various types of processing, such as sorting processing, can be performed on the ciphertext.

However, in a ciphertext sorting process, there is still a risk of data leakage. This reduces the privacy security of the data. Therefore, how to ensure the privacy security of the data becomes an urgent problem to be resolved.

In view of this, this specification provides a data sorting method.

SUMMARY

This specification provides a data sorting method and apparatus, a device, and a readable storage medium.

The following technical solutions are used in this specification: This specification provides a data sorting method, including: determining a to-be-processed array, and selecting a reference ciphertext from the to-be-processed array; for each non-reference ciphertext, determining a first noise value of the non-reference ciphertext, determining a first specified parameter based on an upper limit of a value range of the first noise value, and determining a to-be-compared ciphertext of the non-reference ciphertext based on the first specified parameter and the first noise value; updating the reference ciphertext based on the first specified parameter, and comparing a size of an updated reference ciphertext with a size of the to-be-compared ciphertext of the non-reference ciphertext to obtain a first comparison result of the non-reference ciphertext; dividing the to-be-processed array based on a first comparison result of each non-reference ciphertext, to obtain two subarrays; for each obtained subarray, re-using the subarray as a to-be-processed array, continuing to select a reference ciphertext for comparison with a non-reference ciphertext, and continuing to determine each subarray until a determined subarray includes a single ciphertext; and determining a sorting result of each ciphertext based on a size relationship between the arrays.

This specification provides a data sorting apparatus, including: a reference ciphertext selection module, configured to: determine a to-be-processed array, and select a reference ciphertext from the to-be-processed array; a to-be-compared ciphertext determining module, configured to: for each non-reference ciphertext, determine a first noise value of the non-reference ciphertext, determine a first specified parameter based on an upper limit of a value range of the first noise value, and determine a to-be-compared ciphertext of the non-reference ciphertext based on the first specified parameter and the first noise value; a first comparison module, configured to: update the reference ciphertext based on the first specified parameter, and compare a size of an updated reference ciphertext with a size of the to-be-compared ciphertext of the non-reference ciphertext to obtain a first comparison result of the non-reference ciphertext; a division module, configured to divide the to-be-processed array based on a first comparison result of each non-reference ciphertext, to obtain two subarrays; a re-comparison module, configured to: for each obtained subarray, re-use the subarray as a to-be-processed array, continue to select a reference ciphertext for comparison with a non-reference ciphertext, and continue to determine each subarray until a determined subarray includes a single ciphertext; and a sorting module, configured to determine a sorting result of each ciphertext based on a size relationship between the arrays.

This specification provides a non-transitory computer-readable storage medium. The storage medium stores a computer program, and when the computer program is executed by a processor, the data sorting method is implemented.

This specification provides an electronic device, including a memory, a processor, and a computer program that is stored in the memory and that is capable of running on the processor. When the processor executes the computer program, the data sorting method is implemented.

The above-mentioned at least one technical solution used in the specification can achieve the following beneficial effects: In the data sorting method provided in this specification, a non-reference ciphertext is updated based on a first noise value corresponding to the non-reference ciphertext and a first specified parameter, and each non-reference ciphertext is compared with an updated reference ciphertext. Further, a to-be-processed array is divided into a plurality of subarrays based on a first comparison result. Each subarray is separately re-used as a to-be-processed array. The above-mentioned comparison process is repeated until each array includes only a single ciphertext. A sorting result of each ciphertext is determined based on a size relationship between the arrays. It can be learned that in a ciphertext sorting process, in a manner of updating each non-reference ciphertext based on a noise value and the first specified parameter, even if a comparison result is that the non-reference ciphertext is equal to a reference ciphertext, an original relationship between the non-reference ciphertext and the reference ciphertext is not leaked, thereby improving security and privacy protection of data in the ciphertext sorting process.

BRIEF DESCRIPTION OF DRAWINGS

The accompanying drawings described here are used to provide a further understanding of this specification, and constitute a part of this specification. Example embodiments of this specification and descriptions of the embodiments are used to explain this specification, and do not constitute an inappropriate limitation on this specification.

DESCRIPTION OF EMBODIMENTS

Figure 1:
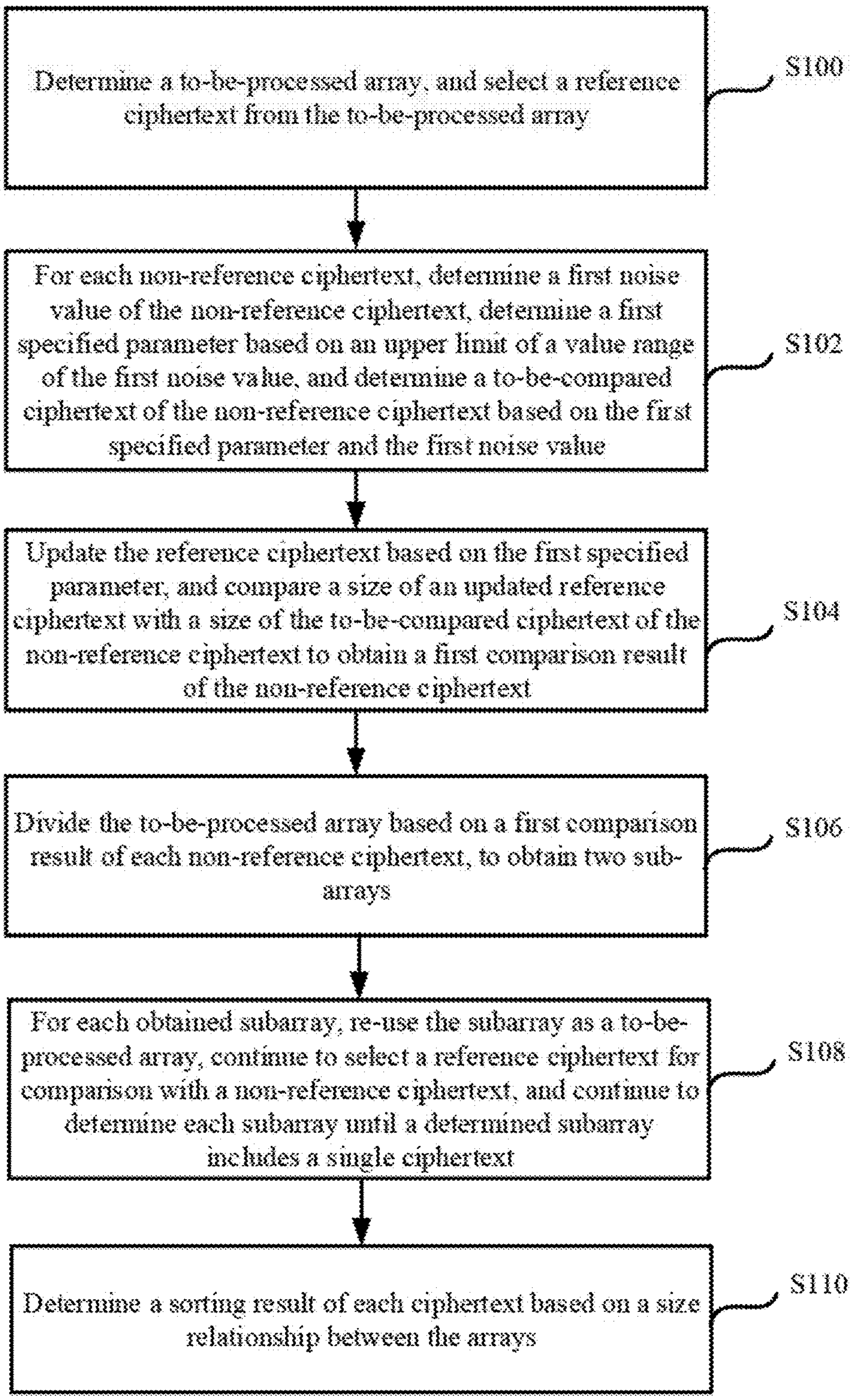
FIG. 1 is a schematic flowchart illustrating a data sorting method, according to this specification.

To make the objectives, technical solutions, and advantages of this specification clearer, the following clearly and comprehensively describes the technical solutions of this specification with reference to specific embodiments and corresponding accompanying drawings of this specification. Clearly, the described embodiments are merely some rather than all of the embodiments of this specification. All other embodiments obtained by a person of ordinary skill in the art based on embodiments of this specification without creative efforts shall fall within the protection scope of this specification.

In addition, it is worthwhile to note that all actions of obtaining a signal, information, or data in this application are performed in compliance with a corresponding data protection policy of a local country, and are authorized by an owner of a corresponding apparatus.

With the rapid development of digital economy, the value of data has been widely recognized by the society. Under the background of big data, because the data can be copied with low copy costs, if the data is developed and circulated in a form of a plaintext, a risk of large-scale data leakage increases sharply, and even personal privacy and national security are infringed.

Based on the above-mentioned actual situation, and to overcome a problem that the data is easy to be copied, the data can be encrypted. As such, the data is circulated in a form of a ciphertext, to ensure that the data is safe and controllable in all links such as circulation, computing, and fusion. The ciphertext can be a form of encrypted data, and a plurality of holders of the ciphertext cannot obtain any information about original data from the ciphertext. Generally, the ciphertext can be used to perform addition, multiplication, logical operation, comparison, and other cryptographic computing. Because input and output of ciphertext computing each are the ciphertext, no leakage (or only a small amount of tolerable leakage) of input and output information occurs in a computing process.

However, there is still a risk of data leakage during actual ciphertext processing. The cryptographic computing is used as an example for comparison. The cryptographic computing aims at sorting ciphertexts based on a size relationship. In a current comparison solution, a comparison result of "equal to" may be determined. To be specific, a malicious attacker can know whether two ciphertexts are equal, which causes leakage of statistical data of the ciphertexts. For example, an encrypted table includes month information of user consumption records. Even if the month information is encrypted, if an equal relationship between several months is determined in a sorting process, a quantity of user consumption records in the month is leaked.

In view of this, this specification provides a data sorting method. In a ciphertext sorting process, each non-reference ciphertext is updated based on a first noise value. Even if a comparison result is that the non-reference ciphertext is equal to a reference ciphertext, an original relationship between the non-reference ciphertext and the reference ciphertext is not leaked, thereby improving security and privacy protection of the non-reference ciphertext.

The following describes in detail the technical solutions provided in one or more embodiments of this specification with reference to the accompanying drawings.

FIG. 1 is a schematic flowchart illustrating a data sorting method, according to this specification.

S100: Determine a to-be-processed array, and select a reference ciphertext from the to-be-processed array.

One or more embodiments of this specification provide the data sorting method. An execution process of the data sorting method can be performed by an electronic device such as a server used to process a ciphertext. The ciphertext can be stored in advance in the electronic device (a current data processing party) that currently executes the data sorting method, or can be obtained in advance, from several other data holders (other ciphertext storage servers), by the electronic device that executes the data sorting method. This is not limited in this specification.

The to-be-processed array can include all ciphertexts that need to be sorted, and initial sorting of the ciphertexts in the to-be-processed array can be random, or can be in sequence based on data sources. This is not limited in this specification.

Optionally, to further avoid ciphertext information leakage, an out-of-order operation can be performed on the ciphertexts in the to-be-processed array before specific sorting is performed. As such, even if a malicious participant learns of a size relationship between the ciphertexts, specific information and statistical information of each ciphertext cannot be learned. In one or more embodiments of the specification, an objective of the out-of-order operation is to split a correspondence between each ciphertext before the out-of-order operation and each ciphertext after the out-of-order operation. A used solution can be any existing out-of-order solution in which out-of-order sorting can be performed on the ciphertexts. This is not limited in this specification. In addition, the out-of-order operation is not a necessary operation in the data sorting method provided in this specification, and whether the out-of-order operation needs to be performed can be determined based on a specific application scenario and a security level. This is not limited in this specification.

In one or more embodiments of this specification, a solution for sorting the ciphertexts is an improvement solution based on a Quicksort algorithm. Therefore, one reference ciphertext can be first selected from the ciphertexts included in the to-be-processed array, the reference ciphertext is used as a reference value, another ciphertext other than the reference ciphertext included in the to-be-processed array is used as the non-reference ciphertext, and a size of each non-reference ciphertext is compared with a size of the reference ciphertext, to help determine a sorting order of each non-reference ciphertext in the to-be-processed array based on each comparison result.

S102: For each non-reference ciphertext, determine a first noise value of the non-reference ciphertext, determine a first specified parameter based on an upper limit of a value range of the first noise value, and determine a to-be-compared ciphertext of the non-reference ciphertext based on the first specified parameter and the first noise value.

During actual application, if comparison results are output as "greater than", "equal to", and "less than" in a comparison solution, the malicious participant steals a ciphertext whose comparison result is "equal to", resulting in information leakage of the ciphertext. In addition, a large quantity of ciphertexts with the equal size may exist in the to-be-processed array. If comparison results are output as "greater than or equal to" and "less than" in the comparison solution, the large quantity of ciphertexts with the equal size may be always grouped into the same subarray. When most ciphertexts in the subarray have the equal size, ciphertext algorithm complexity may increase in a sorting process, to affect sorting efficiency.

Therefore, in one or more embodiments of this specification, the first noise value is determined, and a size of the non-reference ciphertext in a comparison process is changed by using the first noise value of the non-reference ciphertext, so that the non-reference ciphertext whose size may be originally equal to the size of the reference ciphertext is converted into a non-reference ciphertext whose size is not equal to the size of the reference ciphertext. In other words, even if a size of an original non-reference ciphertext is equal to the size of the reference ciphertext, this equal relationship is not reflected in a comparison result. Even if the malicious participant steals the comparison result of the non-reference ciphertext, specific information and statistical information of the non-reference ciphertext cannot be learned, thereby improving security of the ciphertext.

Specifically, the first noise value of each non-reference ciphertext can be obtained by generating a random number corresponding to each non-reference ciphertext, or can be determined based on an original sorting sequence number of each non-reference ciphertext in the to-be-processed array, or can be determined by using any existing method. This is not limited in this specification.

Further, the following case may exist: After the first noise value of the non-reference ciphertext is added to the non-reference ciphertext, the size of the non-reference ciphertext whose size is originally smaller than the size of the reference ciphertext is greater than the size of the reference ciphertext, which causes an error in the comparison result of the non-reference ciphertext. To avoid occurrence of the above-mentioned case, in one or more embodiments of this specification, the first specified parameter is determined based on the upper limit of the value range of the first noise value, the non-reference ciphertext is weighted by using the first specified parameter as a weight, and the weighted non-reference ciphertext is added to the first noise value of the non-reference ciphertext to obtain the to-be-compared ciphertext of the non-reference ciphertext. Because the first specified parameter is greater than the first noise value of the non-reference ciphertext, a proportion of the first noise value in the determined to-be-compared ciphertext becomes smaller. Therefore, a size of the first noise value does not affect a size relationship between the non-reference ciphertext and the reference ciphertext, to help subsequently compare a size of the to-be-compared ciphertext of the non-reference ciphertext with the size of the reference ciphertext until a correct comparison result is obtained.

In addition, it is worthwhile to note that, after the to-be-compared ciphertext of the non-reference ciphertext is determined, the original non-reference ciphertext can be overwritten with the to-be-compared ciphertext; or the to-be-compared ciphertext can be temporarily stored in a cache, only the to-be-compared ciphertext is to be sorted, and the to-be-compared ciphertext in the cache is selectively deleted after sorting ends. This is not limited in this specification.

S104: Update the reference ciphertext based on the first specified parameter, and compare a size of an updated reference ciphertext with the size of the to-be-compared ciphertext of the non-reference ciphertext to obtain a first comparison result of the non-reference ciphertext.

Further, in a process of determining the to-be-compared ciphertext of the non-reference ciphertext in step S102, not only the first noise value is used, but also the first specified parameter is used as the weight to weight the non-reference ciphertext. To measure the size of the non-reference ciphertext through comparison between the size of the reference ciphertext and the size of the to-be-compared ciphertext, an operation similar to that on the non-reference ciphertext can be performed on the reference ciphertext. To be specific, the first specified parameter is used as the weight to weight the reference ciphertext, and the reference ciphertext is updated based on a weighted result.

For example, when the size of the non-reference ciphertext is 1, and the first noise value of the non-reference ciphertext is 2, if the size of the reference ciphertext is 2, the size of the to-be-compared ciphertext is 3 only based on the first noise value and the non-reference ciphertext. In this case, the non-reference ciphertext is originally less than the reference ciphertext, but the to-be-compared ciphertext of the reference ciphertext is greater than the reference ciphertext, so that the first noise value causes an error in the comparison result of the non-reference ciphertext. Therefore, a value 3 of the upper limit of the value range of the first noise value can be used as the first specified parameter. In this case, the size of the to-be-compared ciphertext of the non-reference ciphertext determined based on the first specified parameter and the first noise value is 5, and a size of a reference ciphertext updated based on the first specified parameter is 6. In this case, the comparison result of the non-reference ciphertext does not change.

Further, during actual application, a ciphertext comparison process needs to be supported by network interaction, and even in intranet interaction, a delay of one interaction reaches the order of 1 ms. A network interaction delay has a significant effect on the performance of serial operations. For example, under the above-mentioned network delay, one thousand serial operations require 1 s, and one thousand concurrent operations may require only 2 ms. If concurrency cannot be implemented in a non-reference ciphertext-based data processing process, the processing performance decreases significantly.

Therefore, in a process of comparing each non-reference ciphertext with the reference ciphertext, a comparison result of comparing each non-reference ciphertext with the reference ciphertext can be obtained in a concurrent manner, to help minimize impact of the network interaction delay on the data sorting performance.

In addition, in one or more embodiments of this specification, to avoid leakage of a comparison result of "equal to", a comparison result is obtained in a manner in which the non-reference ciphertext is "greater than or equal to" and "less than" the reference ciphertext, or in a manner in which the non-reference ciphertext is "less than or equal to" and "greater than" the reference ciphertext. A specific one of the above two manners can be determined based on a specific application scenario. This is not limited in this specification.

S106: Divide the to-be-processed array based on a first comparison result of each non-reference ciphertext, to obtain two subarrays.

Specifically, in one or more embodiments of this specification, arrays sorted based on a size relationship need to be obtained, for example, sorted in descending order or sorted in ascending order.

In one or more embodiments of this specification, because there is no "equal to" in the comparison result, the comparison result has only two types. Therefore, in a process of grouping each reference ciphertext into different subarrays based on the first comparison result of each non-reference ciphertext, usually, each ciphertext of a to-be-processed array is grouped into two subarrays. The reference ciphertext can be randomly grouped into either of the two subarrays.

Optionally, a position of the reference ciphertext in the subarray can be directly determined based on the subarray in which the reference ciphertext is located. For example, sorting is performed in descending order, and when the reference ciphertext is grouped into a "greater than or equal to" subarray, it can be learned, based on the first comparison result of each non-reference ciphertext, that the non-reference ciphertext that is grouped into the "greater than or equal to" subarray is greater than or equal to the reference ciphertext. Therefore, it can be directly determined that a position of the reference ciphertext in the "greater than or equal to" subarray is the last. Similarly, if the reference ciphertext is grouped into a "less than" subarray, a position of the reference ciphertext in the "less than" subarray is the first.

Certainly, optionally, it is also possible not to group the reference ciphertext into any subarray in the two subarrays, but the reference ciphertext is separately used as an array and is sorted between the two subarrays. In this way, the array in which the reference ciphertext is located includes only one ciphertext namely the reference ciphertext, and is not further grouped when the subarray is divided next. In addition, this grouping manner does not leak an equal relationship between ciphertexts. Even if the malicious participant learns that the array in which the reference ciphertext is located is sorted between the above-mentioned two subarrays, the malicious participant cannot learn of any numerical information of a subarray that is sorted before or after the array in which the reference ciphertext is located. For example, for to-be-processed array $\{x_1, x_2, x_3, x_4)$, $x_1$ is used as the reference ciphertext, and the to-be-processed array is divided into two subarrays $\{x_2, x_4\}$ and $\{x_3\}$. In this case, $x_1$ can be used as an independent array and is sorted between $\{x_2, x_4\}$ and $\{x_3\}$, that is, it is determined that ciphertexts are sorted in a sequence of $(x_2, x_4\}$, $\{x_1\}$, and $\{x_3\}$.

In an optional embodiment of this specification, after the to-be-processed array is divided into two subarrays, the two subarrays are sorted based on a size relationship. For example, a subarray whose comparison result is "greater than or equal to" is sorted before a subarray whose comparison result is "less than" in descending order. Certainly, after a size relationship of each ciphertext is determined, a sorting order of each ciphertext can be adjusted. Sorting timing is not specifically limited in this specification.

S108: For each obtained subarray, re-use the subarray as a to-be-processed array, continue to select a reference ciphertext for comparison with a non-reference ciphertext, and continue to determine each subarray until a determined subarray includes a single ciphertext.

Because the to-be-processed array can include a plurality of ciphertexts, a size relationship between the ciphertexts cannot be determined by performing only one subarray division. Therefore, the above-mentioned steps S100 to S106 need to be repeated a plurality of times to achieve an objective of sorting each ciphertext included in original to-be-processed data based on the size relationship.

In addition, an end condition of subarray division (or can be understood as performing a sorting operation on each ciphertext) can be that the subarray includes only one ciphertext. Certainly, optionally, the quantity of ciphertexts included in the subarray corresponding to the end condition can be a preset quantity threshold, and the quantity threshold can be determined based on a specific application scenario. This is not limited in this specification.

Alternatively, optionally, a quantity of times for subarray division can be used as the end condition. Sorting ends when a quantity of times for subarray division is greater than a preset quantity threshold.

For example, the to-be-processed array includes ciphertexts $\{x_1, x_2, x_3, x_4\}$, $x_1$ is used as the reference ciphertext, and a size relationship between non-reference ciphertexts $x_2$ and $x_1$, a size relationship between non-reference ciphertexts $x_3$ and $x_1$, a size relationship between non-reference ciphertexts $x_4$ and $x_1$ are respectively determined. If $x_2$ and $x_4$ are grouped into a subarray "greater than or equal to" $x_1$, and $x_3$ is grouped into a subarray "less than" $x_1$, the to-be-processed array can be sorted as $\{x_2, x_4, x_1\}$ and $\{x_3\}$. Further, for subarray $\{x_2, x_4, x_1\}$, because there is more than one ciphertext included in the subarray, the subarray needs to be divided again. The subarray is re-used as a to-be-processed array, $x_2$ is selected as the reference ciphertext, and a size relationship between $x_4$ and $x_2$ and a size relationship between $x_1$ and $x_2$ are determined, to obtain a subarray "greater than or equal to" into which $x_4$ is grouped and a subarray "less than" into which $x_1$ is grouped. Therefore, it can be determined that the ciphertexts are sorted as $\{x_4, x_2, x_1, x_3\}$.

S110: Determine a sorting result of each ciphertext based on a size relationship between the arrays.

Specifically, after the above-mentioned step S108 is completed, the original to-be-processed array can be divided into a plurality of arrays that include only one ciphertext, and a size relationship between the arrays has been determined. In this case, the arrays are sorted based on the size relationship between the arrays in a preset size arrangement manner, to obtain the sorting result of each ciphertext.

In the data sorting method provided in this specification, a non-reference ciphertext is updated based on a first noise value corresponding to the non-reference ciphertext and a first specified parameter, and each non-reference ciphertext is compared with an updated reference ciphertext. Further, a to-be-processed array is divided into a plurality of subarrays based on a comparison result. Each subarray is separately re-used as a to-be-processed array. The above-mentioned comparison process is repeated until each array includes only a single ciphertext. A sorting result of each ciphertext is determined based on a size relationship between the arrays. It can be learned that in a ciphertext sorting process, in a manner of updating each non-reference ciphertext based on a noise value and the first specified parameter, even if a comparison result is that the non-reference ciphertext is equal to a reference ciphertext, an original relationship between the non-reference ciphertext and the reference ciphertext is not leaked, thereby improving security and privacy protection of data in the ciphertext sorting process.

In one or more embodiments of this specification, in FIG. 1, step S102 of determining the first noise value of the non-reference ciphertext for each non-reference ciphertext can be divided into two cases: The first noise value can be a ciphertext, or can be a plaintext. The following separately describes the two cases.

In a first case, when the first noise value is the ciphertext, a ciphertext random number of the non-reference ciphertext can be generated in a cryptographic form as the first noise value of the non-reference ciphertext. The ciphertext random number generated in the cryptographic form is a random number generated in a form of a ciphertext when the random number is generated, and specific information about the random number is not known even to a generator of the random number. This has the advantage that leakage of the first noise value of the non-reference ciphertext does not cause leakage of the comparison result of the non-reference ciphertext, thereby improving data security of ciphertext sorting. The cryptographic form for generating the ciphertext random number can be an existing ciphertext random number generating form such as a form of generating a ciphertext based on a secure multi-party computation (MPC) and a form of a confusing circuit (Garbled Circuit). A specific form of generating the ciphertext random number can be determined based on a preset security level or determined based on another specific application scenario, provided that an effect of the ciphertext random number in one or more embodiments of this specification can be achieved, that is, the random number is generated in the form of the ciphertext. A specific cryptographic for is not limited in this specification.

In a second case, when the first noise value is the plaintext, in an optional manner, a random number is directly generated, and the generated random number is used as the first noise value of the non-reference ciphertext. Another optional manner is applicable to a scenario in which a plurality of data processing parties perform data sorting together. Specifically, it is assumed that there are data processing parties A, B, and C. In the aby3 protocol, data processing party A has ciphertext component ($a_1$, $a_2$), data processing party B has ciphertext component ($a_1$, $a_3$), and data processor C has ciphertext component ($a_2$, $a_3$). When a random number is generated, it is assumed that $a_1$ and $a_3$ are 0. In this case, ciphertext components owned by data processing parties A and C are the same. The two parties can separately generate a random number by using a pre-shared key, and then exchange the generated random numbers to determine whether the random numbers match with each other. If the generated random numbers match with each other, the generated random number can be used as the first noise value of the non-reference ciphertext. Certainly, the first noise value in the form of the plaintext can further be generated by using any existing solution. This is not limited in this specification.

In one or more embodiments of this specification, in step S104, as shown in FIG. 1, of updating the reference ciphertext based on the first specified parameter, a second noise value can be added on this basis, to ensure accuracy of measuring a size of the non-reference ciphertext by using the reference ciphertext. A specific solution is as follows: First, the second noise value of the reference ciphertext is determined within the value range of the first noise value of the non-reference ciphertext.

Specifically, in step S104 in FIG. 1, the reference ciphertext is updated only based on the first specified parameter, that is, the reference ciphertext is weighted by using the first specified parameter as the weight, and then the reference ciphertext is updated by using a weighted reference ciphertext. That is, a size of the weighted reference ciphertext is compared with a size of each non-reference ciphertext. However, because it is determined that the to-be-compared ciphertext is obtained by adding the first noise value to the weighted non-reference ciphertext, a noise value can also be added to the weighted reference ciphertext. In addition, to ensure that the second noise value only achieves an effect of protecting ciphertext information from being leaked, the second noise value is determined within the value range of the first noise value, which can ensure that a difference between the second noise value and the first noise value is not too large, and avoid changing the size relationship between the non-reference ciphertext and the reference ciphertext. In addition, in the ciphertext sorting process, a value of the second noise value can be fixed, or can be determined before each comparison with the non-reference ciphertext. This is not limited in this specification.

Then, the reference ciphertext is weighted by using the first specified parameter as a weight.

Next, the reference ciphertext is updated based on a weighted reference ciphertext and the second noise value of the reference ciphertext.

Specifically, the second noise value of the reference ciphertext is added to the weighted reference ciphertext to obtain the updated reference ciphertext, and the reference ciphertext is updated by using the determined updated reference ciphertext.

In an optional embodiment of this specification, before step S104, as shown in FIG. 1, of comparing the size of the updated reference ciphertext with the size of the to-be-compared ciphertext of the non-reference ciphertext, the non-reference ciphertext can be further updated based on the to-be-compared ciphertext of the non-reference ciphertext, and an updated non-reference ciphertext is compared with the updated reference ciphertext, to obtain the first comparison result.

Further, after the first comparison result is obtained, a specific subarray into which the non-reference ciphertext is grouped can be determined based on the first comparison result. After this, because a value of the current non-reference ciphertext is obtained through weighting and by adding the first noise value, the current non-reference ciphertext needs to be restored. Specifically, a second specified parameter is determined based on a reciprocal of the first specified parameter. Then, for each sorted ciphertext, the sorted ciphertext is weighted by using the second specified parameter as a weight, and an integer part of a weighted result is selected to update the sorted ciphertext.

The above-mentioned sorted ciphertext usually is a ciphertext that has obtained the first comparison result, namely, each non-reference ciphertext that is grouped into the subarray.

The above-mentioned step of restoring the sorted ciphertext can be performed each time a subarray is divided, or can be performed when a sorting result of each ciphertext is finally obtained. Execution timing of the above-mentioned step of restoring the sorted ciphertext is not limited in this specification.

Figure 2:
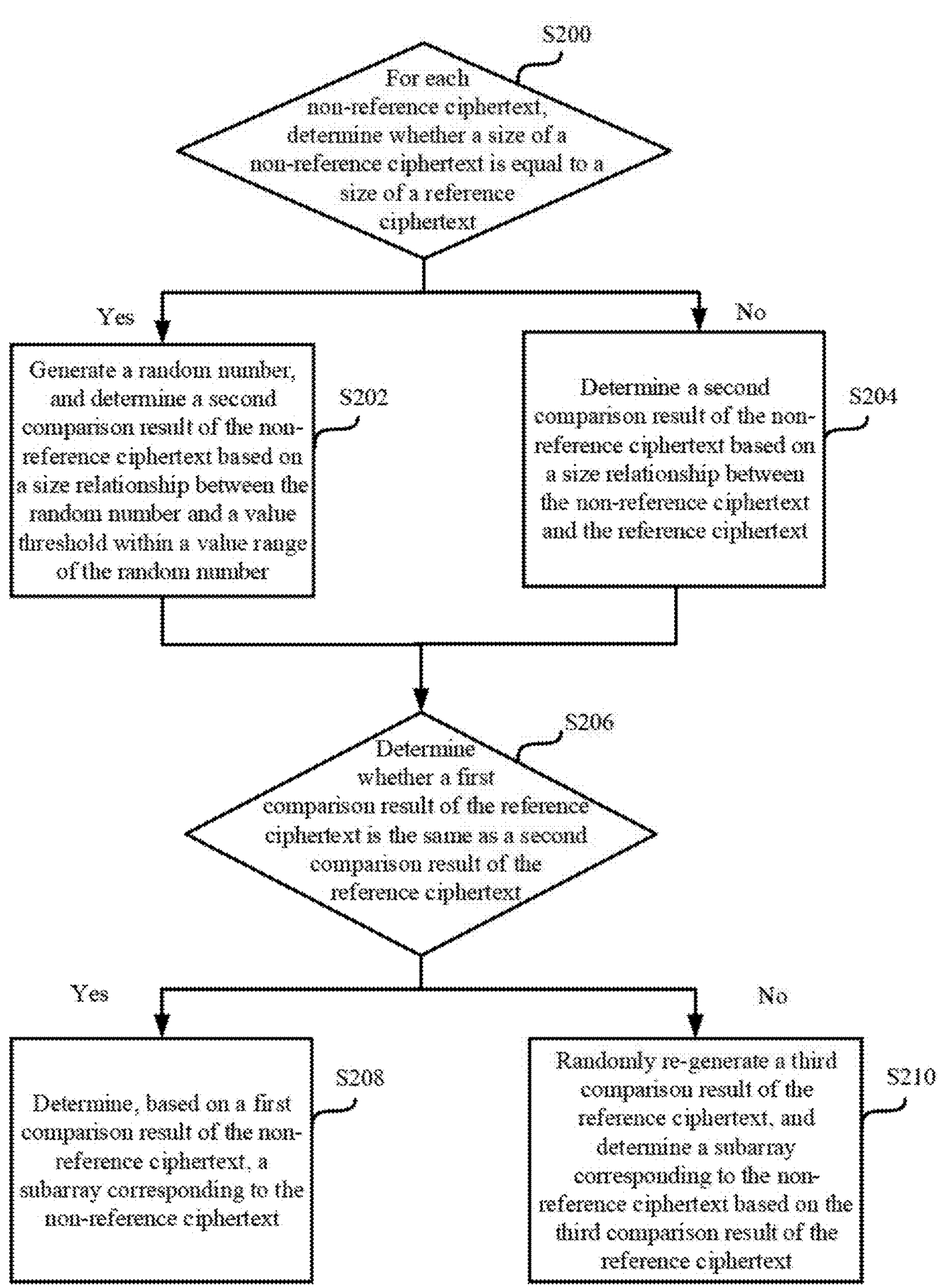
FIG. 2 is a schematic flowchart illustrating a data sorting method, according to this specification.

In an optional embodiment of this specification, before step S106, as shown in FIG. 1, of dividing the to-be-processed array based on the first comparison result of each non-reference ciphertext to obtain the two subarrays, a second comparison result can be determined based on a size relationship between the reference ciphertext and the non-reference ciphertext, and then a specific subarray into which the non-reference ciphertext is grouped is determined jointly based on the first comparison result and the second comparison result. A specific solution is as follows: As shown in FIG. 2, S200: For each non-reference ciphertext, determine whether a size of the non-reference ciphertext is equal to the size of the reference ciphertext; if yes, perform step S202; otherwise, perform step S204.

Specifically, in this case, the non-reference ciphertext used can be a non-reference ciphertext that is not updated, and the reference ciphertext can be a reference ciphertext that is not updated. The size relationship between the non-reference ciphertext and the reference ciphertext is determined in a form of a ciphertext.

S202: Generate a random number, and determine the second comparison result of the non-reference ciphertext based on a size relationship between the random number and a value threshold within a value range of the random number. Step S206 is performed.

If the non-reference ciphertext is equal to the reference ciphertext, in order not to leak an equal relationship between the non-reference ciphertext and the reference ciphertext, the second comparison result of the non-reference ciphertext can be randomly generated. The so-called random generation specifies that the second comparison result of the non-reference ciphertext can be that the non-reference ciphertext is greater than or equal to (or less than or equal to) the reference ciphertext, or less than (or greater than) the reference ciphertext. Therefore, by using a method of generating the random number, a size of the random number is compared with a value threshold within a value range of the random number, and a size relationship between the random number and the value threshold is used as the second comparison result of the non-reference ciphertext. By performing this step, the non-reference ciphertext whose size is originally equal to the size of the reference ciphertext may be grouped into any subarray, so that information about ciphertexts in an equal relationship is not leaked.

S204: Determine a second comparison result of the non-reference ciphertext based on a size relationship between the non-reference ciphertext and the reference ciphertext.

In a case in which the reference ciphertext is not equal to the reference ciphertext, the second comparison result of the non-reference ciphertext can be directly determined based on the size relationship between the reference ciphertext and the reference ciphertext. This is because even if the size relationship between the reference ciphertext and the reference ciphertext is leaked, information about the reference ciphertext and the reference ciphertext is not known to the malicious participant.

S206: Determine whether a first comparison result of the reference ciphertext is the same as a second comparison result of the reference ciphertext. If yes, perform step S208; or if no, perform step S210.

Further, after the second comparison result is determined, the subarray corresponding to the non-reference ciphertext can be determined in a manner of combining the second comparison result with the first comparison result.

S208: Determine, based on the first comparison result of the non-reference ciphertext, a subarray corresponding to the non-reference ciphertext.

Specifically, if the first comparison result and the second comparison result of the non-reference ciphertext are the same, it indicates that the same comparison result is obtained based on the above-mentioned comparison solution in steps S102 to S104 shown in FIG. 1 and the above-mentioned comparison solution in steps S200 to S204, and the comparison result is trusted. Therefore, the first comparison result (or the second comparison result) of the non-reference ciphertext can be directly used as a basis for grouping the reference ciphertext into a specific subarray.

S210: Randomly re-generate a third comparison result of the reference ciphertext, and determine a subarray corresponding to the non-reference ciphertext based on the third comparison result of the reference ciphertext.

Specifically, if the first comparison result and the second comparison result of the non-reference ciphertext are different, it indicates that the comparison results obtained based on the above-mentioned comparison solution in steps S102 to S104 shown in FIG. 1 and the above-mentioned comparison solutions in steps S200 to S204 are different. In this case, neither of the comparison results obtained based on the solutions are suitable for being used as a basis for grouping the reference ciphertext into a subarray. In this case, a third comparison result can be re-generated, and used as the basis for grouping the reference ciphertext into a specific subarray. A specific generation manner can be similar to that in the above-mentioned solution in step S202, and details are not described here again.

Figure 3:
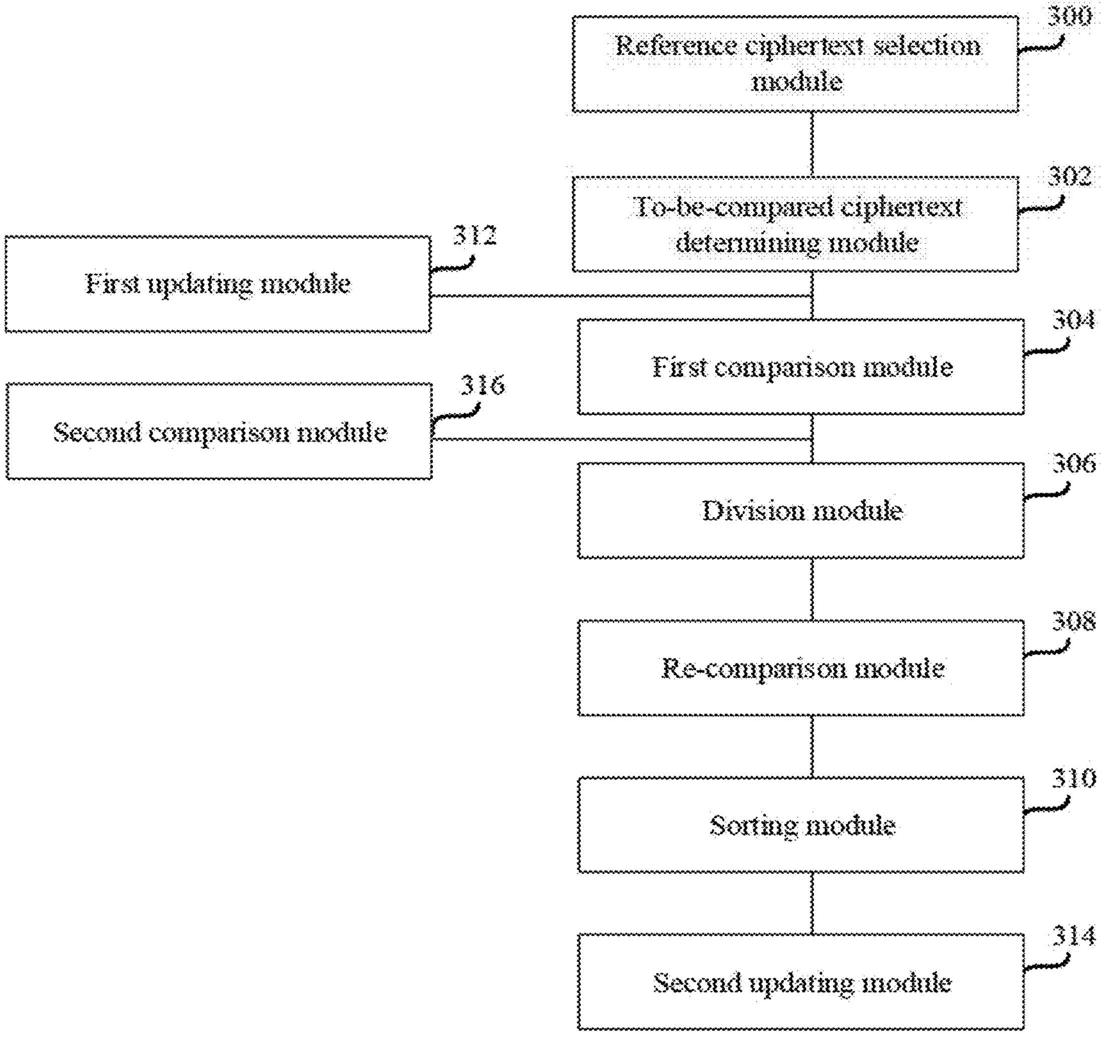
FIG. 3 is a schematic diagram illustrating a data sorting apparatus, according to this specification.

FIG. 3 is a schematic diagram illustrating a data sorting apparatus, according to this specification, specifically including: a reference ciphertext selection module 300, configured to: determine a to-be-processed array, and select a reference ciphertext from the to-be-processed array; a to-be-compared ciphertext determining module 302, configured to: for each non-reference ciphertext, determine a first noise value of the non-reference ciphertext, determine a first specified parameter based on an upper limit of a value range of the first noise value, and determine a to-be-compared ciphertext of the non-reference ciphertext based on the first specified parameter and the first noise value; a first comparison module 304, configured to: update the reference ciphertext based on the first specified parameter, and compare a size of an updated reference ciphertext with a size of the to-be-compared ciphertext of the non-reference ciphertext to obtain a first comparison result of the non-reference ciphertext; a division module 306, configured to divide the to-be-processed array based on a first comparison result of each non-reference ciphertext, to obtain two subarrays; a re-comparison module 308, configured to: for each obtained subarray, re-use the subarray as a to-be-processed array, continue to select a reference ciphertext for comparison with a non-reference ciphertext, and continue to determine each subarray until a determined subarray includes a single ciphertext; and a sorting module 310, configured to determine a sorting result of each ciphertext based on a size relationship between the arrays.

Optionally, the to-be-compared ciphertext determining module 302 is specifically configured to: generate a random number corresponding to the non-reference ciphertext; determine a specified key, and encrypt, based on the specified key, the random number corresponding to the non-reference ciphertext to obtain a ciphertext random number as the first noise value of the non-reference ciphertext.

Optionally, the first comparison module 304 is specifically configured to: determine a second noise value of the reference ciphertext within the value range of the first noise value of the non-reference ciphertext; weight the reference ciphertext by using the first specified parameter as a weight; and update the reference ciphertext based on a weighted reference ciphertext and the second noise value of the reference ciphertext.

Optionally, the apparatus further includes a first updating module 312, specifically configured to update the non-reference ciphertext based on the to-be-compared ciphertext of the non-reference ciphertext. The first comparison module is specifically configured to compare the size of the updated reference ciphertext with a size of an updated non-reference ciphertext to obtain the comparison result of the non-reference ciphertext.

Optionally, the apparatus further includes a second updating module 314, specifically configured to: determine a second specified parameter based on a reciprocal of the first specified parameter; and for each sorted ciphertext, weight the sorted ciphertext by using the second specified parameter as a weight, and update the sorted ciphertext by using an integer part of a weighting result.

Optionally, the apparatus further includes: a second comparison module 316, specifically configured to: for each non-reference ciphertext, determine whether a size of the non-reference ciphertext is equal to the size of the reference ciphertext; and if yes, generate a random number, and determine a second comparison result of the non-reference ciphertext based on a size relationship between the random number and a value threshold within a value range of the random number; or if no, determine a second comparison result of the non-reference ciphertext based on a size relationship between the non-reference ciphertext and the reference ciphertext.

Optionally, the division module 306 is specifically configured to: determine whether a first comparison result of the reference ciphertext is the same as a second comparison result of the reference ciphertext; and if yes, determine, based on the first comparison result of the non-reference ciphertext, a subarray corresponding to the non-reference ciphertext; or if no, randomly re-generate a third comparison result of the reference ciphertext, and determine a subarray corresponding to the non-reference ciphertext based on the third comparison result of the reference ciphertext.

This specification further provides a computer-readable storage medium. The storage medium stores a computer program, and the computer program can be used to perform the data sorting method shown in FIG. 1.

Figure 4:
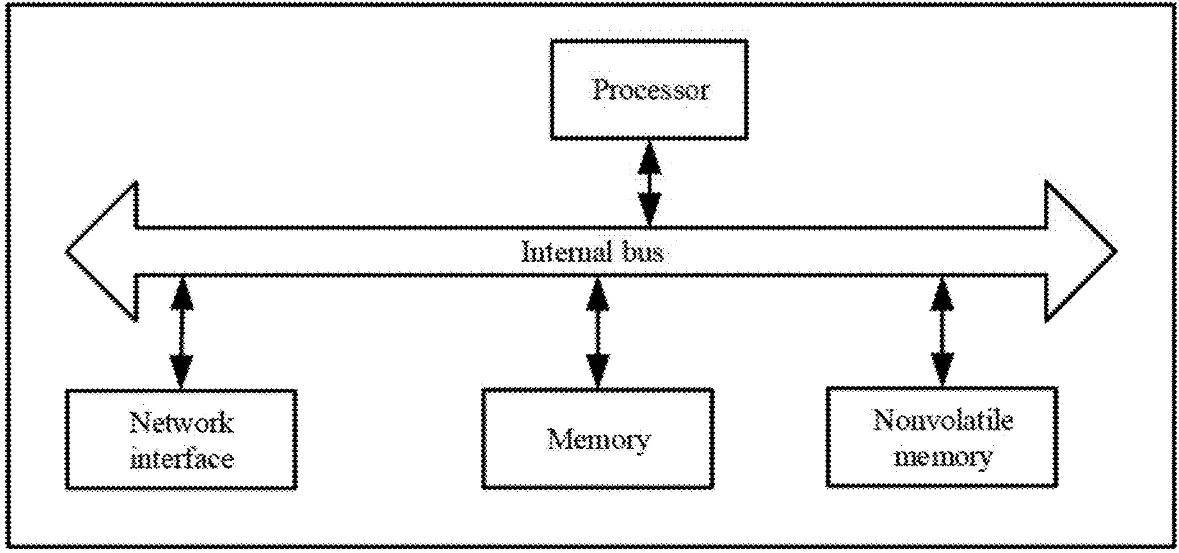
FIG. 4 is a schematic diagram illustrating an electronic device corresponding to FIG. 1, according to this specification.

This specification further provides a schematic structural diagram illustrating an electronic device shown in FIG. 4. As shown in FIG. 4, in terms of hardware, the electronic device includes a processor, an internal bus, a network interface, a memory, and a nonvolatile memory, and certainly may further include hardware needed by another service. The processor reads a corresponding computer program from the nonvolatile memory into the memory and then runs the computer program, to implement the data sorting method shown in FIG. 1. Certainly, in addition to software implementations, another implementation is not excluded in this specification, for example, a logic device or a combination of hardware and software. In other words, an execution body of the following processing process is not limited to logical units, and can be hardware or a logic device.

In the 1990s, whether a technical improvement is a hardware improvement (for example, an improvement to a circuit structure, such as a diode, a transistor, or a switch) or a software improvement (an improvement to a method procedure) can be clearly distinguished. However, with development of technologies, improvement to many existing method procedures can be considered as direct improvement to hardware circuit structures. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. A designer autonomously performs programming to "integrate" a digital system onto a PLD, without requesting a chip manufacturer to design and manufacture an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. It should also be clear to a person skilled in the art that a hardware circuit for implementing a logical method procedure can be easily obtained by performing slight logic programming on the method procedure by using the above-mentioned several hardware description languages and programming the method procedure into an integrated circuit.

A controller can be implemented by using any appropriate method. For example, the controller can be a microprocessor or a processor, or a computer readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. A storage controller can also be implemented as a part of the control logic of the storage. A person skilled in the art also knows that, in addition to implementing the controller by using only computer-readable program code, logic programming can be performed on a method step, so the controller implements a same function in a form of a logic gate, a switch, an application-specific integrated circuit, a programmable logic controller, an embedded microcontroller, etc. Therefore, the controller can be considered as a hardware component, and an apparatus included in the controller and configured to implement various functions can also be considered as a structure in the hardware component. Alternatively, the apparatus configured to implement various functions can even be considered as both a software module implementing the method and a structure in the hardware component.

The system, apparatus, module, or unit illustrated in the previous embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the above-mentioned apparatus is described by dividing functions into various units. Certainly, when this specification is implemented, functions of the units can be implemented in one or more pieces of software and/or hardware.

A person skilled in the art should understand that one or more embodiments of this specification can be provided as a method, a system, or a computer program product. Therefore, this specification can use a form of hardware only embodiments, software only embodiments, or embodiments with a combination of software and hardware. Moreover, a form of a computer program product that is implemented on one or more computer-usable storage media (including but not limited to a disk memory, a CD-ROM, an optical memory, etc.) that include computer-usable program code can be used in this specification.

This specification is described with reference to the flowcharts and/or block diagrams of the method, the device (system), and the computer program product based on the embodiments of this specification. It should be understood that each procedure and/or block in the flowcharts and/or the block diagrams and a combination of procedures and/or blocks in the flowcharts and/or the block diagrams can be implemented by using computer program instructions. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more procedures in the flowcharts and/or in one or more blocks in the block diagrams.

Alternatively, these computer program instructions can be stored in a computer-readable storage that can instruct a computer or another programmable data processing device to work in a specific manner, so the instructions stored in the computer-readable storage generate an artifact that includes an instruction apparatus. The instruction apparatus implements a specific function in one or more procedures in the flowcharts and/or in one or more blocks in the block diagrams.

Alternatively, these computer program instructions can be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPUs), one or more input/output interfaces, one or more network interfaces, and one or more memories.

The memory may include a form such as a volatile memory, a random access memory (RAM), or a nonvolatile memory in a computer-readable medium, for example, a read-only memory (ROM) or a flash memory (flash RAM). The memory is an example of the computer-readable medium.

The computer-readable medium includes persistent, non-persistent, removable and non-removable media that can store information by using any method or technology. The information can be computer-readable instructions, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information that can be accessed by a computing device. Based on the definition in this specification, the computer-readable medium does not include transitory media such as a modulated data signal and carrier.

It is also worthwhile to note that terms "include", "contain" or any other variant is intended to cover non-exclusive inclusion, so processes, methods, products or devices that include a series of elements include not only those elements but also other elements that are not explicitly listed, or elements inherent in such processes, methods, products or devices. Without more constraints, an element preceded by "includes a . . . " does not preclude the presence of additional identical elements in the process, method, product, or device that includes the element.

A person skilled in the art should understand that the embodiments of this specification can be provided as methods, systems, or computer program products. Therefore, a form of hardware only embodiments, software only embodiments, or embodiments with a combination of software and hardware can be used in this specification. Moreover, a form of a computer program product that is implemented on one or more computer-usable storage media (including but not limited to a disk memory, a CD-ROM, an optical memory, etc.) that include computer-usable program code can be used in this specification.

This specification can be described in the general context of a computer-executable instruction executed by a computer, for example, a program module. Usually, the program module includes a routine, a program, an object, a component, a data structure, etc. for executing a specific task or implementing a specific abstract data type. This specification can alternatively be practiced in distributed computing environments. In the distributed computing environments, tasks are executed by remote processing devices connected through a communication network. In the distributed computing environments, the program module can be located in both local and remote computer storage media including storage devices.

The embodiments of this specification are described in a progressive manner. For same or similar parts in the embodiments, refer to each other. Each embodiment focuses on a difference from other embodiments. Particularly, the system embodiment is basically similar to the method embodiment, and therefore is briefly described. For a related part, refer to some descriptions in the method embodiment.

The above-mentioned descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A data security method of an electronic device, wherein the method comprises:

determining a to-be-processed array, and selecting a reference ciphertext from the to-be-processed array;

for each non-reference ciphertext, determining a first noise value of a non-reference ciphertext, determining a first specified parameter based on an upper limit of a value range of the first noise value, and determining a to-be-compared ciphertext of the non-reference ciphertext based on the first specified parameter and the first noise value;

updating the reference ciphertext based on the first specified parameter, and comparing a size of an updated reference ciphertext with a size of the to-be-compared ciphertext of the non-reference ciphertext to obtain a first comparison result of the non-reference ciphertext;

preventing a first leakage of the first noise value at the electronic device from causing a second leakage of the first comparison result at the electronic device based on linking the first noise value to a ciphertext random number;

dividing the to-be-processed array based on a first comparison result of each non-reference ciphertext, to obtain two subarrays;

for each obtained subarray, re-using an obtained subarray as a to-be-processed array, continuing to select a reference ciphertext for comparison with a non-reference ciphertext, and continuing to determine each subarray until a determined subarray comprises a single ciphertext; and determining a sorting result of each ciphertext based on a size relationship between the arrays.

2. The method according to claim 1, wherein the determining a first noise value of a non-reference ciphertext comprises:

generating the ciphertext random number of the non-reference ciphertext in a cryptographic form as the first noise value of the non-reference ciphertext.

3. The method according to claim 1, wherein the updating the reference ciphertext based on the first specified parameter comprises:

determining a second noise value of the reference ciphertext within the value range of the first noise value of the non-reference ciphertext;

weighting the reference ciphertext by using the first specified parameter as a weight; and updating the reference ciphertext based on a weighted reference ciphertext and the second noise value of the reference ciphertext.

4. The method according to claim 1, wherein before the comparing a size of an updated reference ciphertext with a size of the to-be-compared ciphertext of the non-reference ciphertext, the method further comprises:

updating the non-reference ciphertext based on the to-be-compared ciphertext of the non-reference ciphertext; and the comparing a size of an updated reference ciphertext with a size of the to-be-compared ciphertext of the non-reference ciphertext to obtain a first comparison result of the non-reference ciphertext comprises:

comparing the size of the updated reference ciphertext with a size of an updated non-reference ciphertext to obtain the comparison result of the non-reference ciphertext.

5. The method according to claim 4, wherein the method further comprises:

determining a second specified parameter based on a reciprocal of the first specified parameter; and for each sorted ciphertext, weighting the sorted ciphertext by using the second specified parameter as a weight, and updating the sorted ciphertext by using an integer part of a weighting result.

6. The method according to claim 1, wherein before the dividing the to-be-processed array based on a first comparison result of each non-reference ciphertext, the method further comprises:

for each non-reference ciphertext, determining whether a size of the non-reference ciphertext is equal to the size of the reference ciphertext; and upon determining that the size of the non-reference ciphertext is equal to the size of the reference ciphertext, generating a random number, and determining a second comparison result of the non-reference ciphertext based on a size relationship between the random number and a value threshold within a value range of the random number; or upon determining that the size of the non-reference ciphertext is not equal to the size of the reference ciphertext, determining a second comparison result of the non-reference ciphertext based on a size relationship between the non-reference ciphertext and the reference ciphertext.

7. The method according to claim 6, wherein the dividing the to-be-processed array based on a first comparison result of each non-reference ciphertext comprises:

determining whether a first comparison result of the non-reference ciphertext is the same as a second comparison result of the non-reference ciphertext; and upon determining that the first comparison result of the non-reference ciphertext is the same as a second comparison result of the non-reference ciphertext, determining, based on the first comparison result of the non-reference ciphertext, a subarray corresponding to the non-reference ciphertext; or upon determining that the first comparison result of the non-reference ciphertext is not the same as a second comparison result of the non-reference ciphertext, randomly re-generating a third comparison result of the reference ciphertext, and determining a subarray corresponding to the non-reference ciphertext based on the third comparison result of the reference ciphertext.

8. A non-transitory computer-readable storage medium, wherein the storage medium stores a computer program, and when the computer program is executed by a processor, the processor is caused to implement a data security method of an electronic device, and the method comprises:

determining a to-be-processed array, and selecting a reference ciphertext from the to-be-processed array;

for each non-reference ciphertext, determining a first noise value of a non-reference ciphertext, determining a first specified parameter based on an upper limit of a value range of the first noise value, and determining a to-be-compared ciphertext of the non-reference ciphertext based on the first specified parameter and the first noise value;

updating the reference ciphertext based on the first specified parameter, and comparing a size of an updated reference ciphertext with a size of the to-be-compared ciphertext of the non-reference ciphertext to obtain a first comparison result of the non-reference ciphertext;

preventing a first leakage of the first noise value at the electronic device from causing a second leakage of the first comparison result at the electronic device based on linking the first noise value to a ciphertext random number;

dividing the to-be-processed array based on a first comparison result of each non-reference ciphertext, to obtain two subarrays;

for each obtained subarray, re-using an obtained subarray as a to-be-processed array, continuing to select a reference ciphertext for comparison with a non-reference ciphertext, and continuing to determine each subarray until a determined subarray comprises a single ciphertext; and determining a sorting result of each ciphertext based on a size relationship between the arrays.

9. An electronic device, comprising a memory, a processor, and a computer program that is stored in the memory and that is capable of running on the processor, wherein when the processor executes the computer program, the processor is caused to implement a data security method of the electronic device, and the method comprises:

determining a to-be-processed array, and selecting a reference ciphertext from the to-be-processed array;

for each non-reference ciphertext, determining a first noise value of a non-reference ciphertext, determining a first specified parameter based on an upper limit of a value range of the first noise value, and determining a to-be-compared ciphertext of the non-reference ciphertext based on the first specified parameter and the first noise value;

updating the reference ciphertext based on the first specified parameter, and comparing a size of an updated reference ciphertext with a size of the to-be-compared ciphertext of the non-reference ciphertext to obtain a first comparison result of the non-reference ciphertext;

preventing a first leakage of the first noise value at the electronic device from causing a second leakage of the first comparison result at the electronic device based on linking the first noise value to a ciphertext random number;

dividing the to-be-processed array based on a first comparison result of each non-reference ciphertext, to obtain two subarrays;

for each obtained subarray, re-using an obtained subarray as a to-be-processed array, continuing to select a reference ciphertext for comparison with a non-reference ciphertext, and continuing to determine each subarray until a determined subarray comprises a single ciphertext; and determining a sorting result of each ciphertext based on a size relationship between the arrays.

10. The non-transitory computer-readable storage medium according to claim 8, wherein the determining a first noise value of a non-reference ciphertext comprises:

generating the ciphertext random number of the non-reference ciphertext in a cryptographic form as the first noise value of the non-reference ciphertext.

11. The non-transitory computer-readable storage medium according to claim 8, wherein the updating the reference ciphertext based on the first specified parameter comprises:

determining a second noise value of the reference ciphertext within the value range of the first noise value of the non-reference ciphertext;

weighting the reference ciphertext by using the first specified parameter as a weight; and updating the reference ciphertext based on a weighted reference ciphertext and the second noise value of the reference ciphertext.

12. The non-transitory computer-readable storage medium according to claim 8, wherein before the comparing a size of an updated reference ciphertext with a size of the to-be-compared ciphertext of the non-reference ciphertext, the processor is further caused to:

update the non-reference ciphertext based on the to-be-compared ciphertext of the non-reference ciphertext; and the comparing a size of an updated reference ciphertext with a size of the to-be-compared ciphertext of the non-reference ciphertext to obtain a first comparison result of the non-reference ciphertext comprises:

comparing the size of the updated reference ciphertext with a size of an updated non-reference ciphertext to obtain the comparison result of the non-reference ciphertext.

13. The non-transitory computer-readable storage medium according to claim 12, wherein the processor is further caused to:

determine a second specified parameter based on a reciprocal of the first specified parameter; and for each sorted ciphertext, weight the sorted ciphertext by using the second specified parameter as a weight, and update the sorted ciphertext by using an integer part of a weighting result.

14. The non-transitory computer-readable storage medium according to claim 8, wherein before the dividing the to-be-processed array based on a first comparison result of each non-reference ciphertext, the processor is further caused to:

for each non-reference ciphertext, determine whether a size of the non-reference ciphertext is equal to the size of the reference ciphertext; and upon determining that the size of the non-reference ciphertext is equal to the size of the reference ciphertext, generate a random number, and determine a second comparison result of the non-reference ciphertext based on a size relationship between the random number and a value threshold within a value range of the random number; or upon determining that the size of the non-reference ciphertext is not equal to the size of the reference ciphertext, determine a second comparison result of the non-reference ciphertext based on a size relationship between the non-reference ciphertext and the reference ciphertext.

15. The electronic device according to claim 9, wherein the determining a first noise value of a non-reference ciphertext comprises:

generating the ciphertext random number of the non-reference ciphertext in a cryptographic form as the first noise value of the non-reference ciphertext.

16. The electronic device according to claim 9, wherein the updating the reference ciphertext based on the first specified parameter comprises:

determining a second noise value of the reference ciphertext within the value range of the first noise value of the non-reference ciphertext;

weighting the reference ciphertext by using the first specified parameter as a weight; and updating the reference ciphertext based on a weighted reference ciphertext and the second noise value of the reference ciphertext.

17. The electronic device according to claim 9, wherein before the comparing a size of an updated reference ciphertext with a size of the to-be-compared ciphertext of the non-reference ciphertext, the electronic device is further caused to:

update the non-reference ciphertext based on the to-be-compared ciphertext of the non-reference ciphertext; and the comparing a size of an updated reference ciphertext with a size of the to-be-compared ciphertext of the non-reference ciphertext to obtain a first comparison result of the non-reference ciphertext comprises:

comparing the size of the updated reference ciphertext with a size of an updated non-reference ciphertext to obtain the comparison result of the non-reference ciphertext.

18. The electronic device according to claim 17, wherein the electronic device is further caused to:

determine a second specified parameter based on a reciprocal of the first specified parameter; and for each sorted ciphertext, weight the sorted ciphertext by using the second specified parameter as a weight, and update the sorted ciphertext by using an integer part of a weighting result.

19. The electronic device according to claim 9, wherein before the dividing the to-be-processed array based on a first comparison result of each non-reference ciphertext, the electronic device is further caused to:

for each non-reference ciphertext, determine whether a size of the non-reference ciphertext is equal to the size of the reference ciphertext; and upon determining that the size of the non-reference ciphertext is equal to the size of the reference ciphertext, generate a random number, and determine a second comparison result of the non-reference ciphertext based on a size relationship between the random number and a value threshold within a value range of the random number; or upon determining that the size of the non-reference ciphertext is not equal to the size of the reference ciphertext, determine a second comparison result of the non-reference ciphertext based on a size relationship between the non-reference ciphertext and the reference ciphertext.

20. The electronic device according to claim 19, wherein the dividing the to-be-processed array based on a first comparison result of each non-reference ciphertext comprises:

determining whether a first comparison result of the non-reference ciphertext is the same as a second comparison result of the non-reference ciphertext; and upon determining that the first comparison result of the non-reference ciphertext is the same as a second comparison result of the non-reference ciphertext, determining, based on the first comparison result of the non-reference ciphertext, a subarray corresponding to the non-reference ciphertext; or upon determining that the first comparison result of the non-reference ciphertext is not the same as a second comparison result of the non-reference ciphertext, randomly re-generating a third comparison result of the reference ciphertext, and determining a subarray corresponding to the non-reference ciphertext based on the third comparison result of the reference ciphertext.

* * * * *